(12) United States Patent
Hamatsu et al.

(10) Patent No.: US 7,346,337 B2
(45) Date of Patent: Mar. 18, 2008

(54) COMMUNICATION TERMINAL FOR RESTRICTING THE USE OF CONTENT

(75) Inventors: Makoto Hamatsu, Yokohama (JP); Kazuya Anzawa, Yokohama (JP); Riko Nagai, Ichikawa (JP)

(73) Assignee: NTT DoCoMo, Inc., Tokyo (JP)

( * ) Notice: Subject to any disclaimer, the term of this patent is extended or adjusted under 35 U.S.C. 154(b) by 437 days.

(21) Appl. No.: 10/452,842

(22) Filed: Jun. 2, 2003

(65) Prior Publication Data
US 2004/0029536 A1    Feb. 12, 2004

(30) Foreign Application Priority Data
Jun. 17, 2002    (JP) .............................. 2002-175994
Dec. 17, 2002    (JP) .............................. 2002-365711

(51) Int. Cl.
*H04M 1/66* (2006.01)
*H04L 9/10* (2006.01)

(52) U.S. Cl. ........................................ 455/410; 705/52

(58) Field of Classification Search ................ 455/410, 455/411; 705/52; 709/225, 226, 229; 370/229–237
See application file for complete search history.

(56) References Cited

U.S. PATENT DOCUMENTS

| 4,494,211 | A |   | 1/1985  | Schwartz |         |
|-----------|---|---|---------|----------|---------|
| 5,204,897 | A | * | 4/1993  | Wyman ........................ | 705/59 |
| 5,444,780 | A | * | 8/1995  | Hartman, Jr. ................ | 380/30 |
| 5,892,900 | A | * | 4/1999  | Ginter et al. ................. | 726/26 |
| 5,925,127 | A |   | 7/1999  | Ahmad    |         |
| 6,003,082 | A | * | 12/1999 | Gampper et al. ........... | 709/225 |
| 2002/0120465 | A1 | * | 8/2002 | Mori et al. .................... | 705/1 |

FOREIGN PATENT DOCUMENTS

| EP | 0 807 873 A1 | 11/1997 |
| JP | 2001-356966 | 12/2001 |
| WO | WO 00/04712 A1 | 1/2000 |

\* cited by examiner

*Primary Examiner*—Rafael Perez-Gutierrez
*Assistant Examiner*—My X Nguyen
(74) *Attorney, Agent, or Firm*—Brinks Hofer Gilson & Lione

(57) ABSTRACT

Mobile terminal receives from a server a content, a sending time information which indicates the time of sending the content, and a time restriction information that indicates the time period when the content can be used. Mobile terminal correlates the content with the sending time information and the time restriction information, and stores them. Mobile terminal calculates the difference between the time of receiving the content and the sending time information. Mobile terminal correlates the difference with the content and stores them. Mobile terminal adds the difference to the current time kept by time keeping unit to obtain a usage determination reference time. Mobile terminal compares the usage determination reference time with the time restriction information to determine whether the mobile terminal can use the content or not.

26 Claims, 12 Drawing Sheets

FIG. 3

| CONTENT ID | CONTENT |
|---|---|
| C0001 | XXXXX |
| C0002 | XXXXXX |
| C0003 | XXXXX |
| ... | ... |

1021

1022

| CONTENT ID | XHTML FILE |
|---|---|
| C0001 | \<html>\<head>\<title>DOWNLOAD PAGE FOR COMMERCIAL VIDEO CLIP 1 \</title>\</head>\<body> \<object declare id="1cm.declaration" data="URLC0001" type="video/3gpp"> \<param name="period" value="2002/05/08/10/00" valuetype="data">\</object> \<A href="#1cm.declaration">COMMERCIAL 1\</A> \</body>\</html> |
| C0002 | \<html>\<head>\<title>DOWNLOAD PAGE FOR COMMERCIAL VIDEO CLIP 2 \</title>\</head>\<body> \<object declare id="2cm.declaration" data="URLC0002" type="video/3gpp"> \<param name="span" value="30" valuetype="data"> \<param name="start" value="2002/12/24/00/00" valuetype="data">\</object> \<A href="#2cm.declaration">COMMERCIAL 2\</A> \</body>\</html> |
| C0003 | ... |
| ... | ... |

| CONTENT ID | CONTENT |
|---|---|
| C0001 | XXXXX |
| C0002 | XXXXX |
| C0003 | XXXXX |
| ⋮ | ⋮ |

| CONTENT ID | TIME DIFFERENCE INFORMATION TS | TIME RESTRICTION INFORMATION | TIME RESET FLAG |
|---|---|---|---|
| C0001 | 2 MINUTES | <param name="period" value="2002/05/08/10/00" valuetype="data"> | 0 |
| C0002 | 1 MINUTE | <param name="span" value="30" valuetype="data"><br><param name="start" value="2002/12/24/00/00" valuetype="data"> | 0 |
| C0003 | ⋮ | ⋮ | ⋮ |
| ⋮ | ⋮ | ⋮ | ⋮ |

| TIME SETTING FLAG |
|---|
| 1 |

FIG. 11

| ELAPSED TIME | AT THE POINT OF CONTENT DOWNLOAD | BEFORE TIME CHANGE | AFTER TIME CHANGE | AT THE POINT OF INSTRUCT TO PROCESS CONTENT |
|---|---|---|---|---|
| | 0 | T1-T0 | T1-T0 | T3-T0 |
| TIME OF TIME KEEPING UNIT 404 OF MOBILE TELEPHONE 40 | T0 | T1 | T2 | $MT = T3 + (T2-T1)$ |
| TIME OF TIME KEEPING UNIT 103 OF CONTENT SERVER 10 | C0 | C0+T1-T0 | C0+T1-T0 | $CT = C0 + T3 - T0$ |
| TIME DIFFERENCE INFORMATION TS | C0-T0 | | $(C0-T0)+(T1-T2)$ | $TS = (C0-T0)+(T1-T2)$ |
| USAGE DETERMINATION REFERENCE TIME JT = TIME OF TIME KEEPING UNIT 404 + TIME DIFFERENCE INFORMATION TS | $(C0-T0)+T0 = C0$ | | | $JT = \{T3+(T2-T1)\} + \{(C0-T0)+(T1-T2)\}$ $= C0+T3-T0$ |

FIG. 12

| CONTENT ID | TIME RESTRICTION INFO. | TIME RESET FLAG | ADDRESS |
|---|---|---|---|
| C0001 | <param name="period" value="2002/05/08/10/00" valuetype="data"> | 0 | 225.11.22.33 |
| C0002 | <param name="span" value="30"valuetype="data"><paramname="start"value="2002/12/24/00/00" valuetype="data"> | 0 | 190.236.10.0 |
| C0003 | ⋮ | 0 | 190.236.20.0 |
| ⋮ | ⋮ | ⋮ | ⋮ |

| ADDRESS | TIME DIFFERENCE INFORMATION TS |
|---|---|
| 225.11.22.33 | 2 MINUTES |
| 190.236.10.0 | 1 MINUTE |
| 190.236.20.0 | 3 SECONDS |
| ⋮ | ⋮ |

COMMUNICATION TERMINAL FOR RESTRICTING THE USE OF CONTENT

BACKGROUND OF THE INVENTION

1. Field of the Invention

The present invention relates to a technique for restricting the use of content.

2. Description of the Related Art

A conventional mobile telephone with a packet communication function can download from servers on the Internet various content such as programs, image data, music data and so on. Although many of these contents can be used freely, some of them can't because of usage restriction set by the content supplier. For example, when delivering music data before its shipment for advertisement or a sample, it is preferable for content providers to be able to set a usage period for the music data; thus allowing the listener to play them until the usage period and prohibiting him from playing them after that.

To realize this, Japanese patent application Laid-open No. 2001-356966 filed on Jun. 14, 2000 discloses one method. In the method, when a server sends a content to a mobile telephone, the server adds to the header of the content information indicating the usage period. By this information, when the mobile telephone plays the content, the mobile telephone determines whether the time kept by its clock function passes the usage period.

However, the time of the mobile telephone is not always accurate, because some users of the mobile telephone may want to set the time from his own necessity; for example setting five minutes ahead of the correct time. In addition, when the user of the mobile telephone sets the time of the mobile telephone behind the correct time, the user can use the content that is overdue. To prevent this, there can be a following method. That is, when a mobile telephone processes a content, the mobile telephone receives a reference time from an external device such as Global Positioning System (GPS) satellites or a time server, and the mobile telephone compares the reference time and the usage period of the content.

However, the above method has a drawback in that when the mobile telephone processes the content, if it is situated in an underground or a tunnel where it cannot receive the reference time from GPS satellite or a time server, it cannot conduct a time comparison correctly. Further, for a method using a GPS satellite, mobile telephones have to be equipped with GPS receivers. Also, for a method using a time server, it is necessary to prepare and maintain the servers and other facilities. Both methods require additional cost.

BRIEF SUMMARY OF THE INVENTION

The present invention is made in light of the above circumstances. The present invention has as its objective the provision of a method to restrict the usage of the content in a simple manner without being affected by the time kept by the clock of the mobile terminal or by the communication environment of the mobile terminal.

In order to solve the above drawbacks, the present invention provides a communication terminal comprising:

a time keeping unit for keeping time;

a content storage unit for receiving a content, a sending time information, and a time restriction information, and for correlating and storing them; the content being stored in a server, the sending time information indicating a time when the server sends the content, the time restriction information indicating a time when the content can be used;

a difference information calculation unit for calculating a time difference information indicating a difference between the sending time stored in the content storage unit and the time kept by the time keeping unit at the time of receiving the content, and for correlating the time difference information with the content and storing them;

a reference time calculating unit for, by adding the time kept by time keeping unit and the time difference calculated by the difference information calculation unit, calculating a usage determination reference time that indicates a time period when the communication terminal can use the content; and a content usage determination unit for determining whether the content can be used on the communication terminal by comparing the time indicated by the usage determination reference time with the time indicated by time restriction information.

Further, the present invention provides a communication terminal comprising:

a time keeping unit for keeping time;

a content storage unit for receiving a content, a sending time information, and a time restriction information, and for correlating and storing them; the content being stored in a server, the sending time information indicating a time when the server sends the content, the time restriction information indicating a time when the content can be used;

a difference information calculation unit for calculating a time difference information indicating a difference between the sending time stored in the content storage unit and the time kept by the time keeping unit at the time of receiving the content, and for correlating the time difference information with an identification information of the server and storing them;

a reference time calculating unit for, by adding the time kept by time keeping unit and the time difference calculated by the difference information calculation unit, calculating a usage determination reference time that indicates a time period when the communication terminal can use the content; and a content usage determination unit for determining whether the content can be used on the communication terminal by comparing the time indicated by the usage determination reference time with the time indicated by time restriction information.

According to the present invention, a server sends a content. A communication terminal correlates a time restriction information and time difference information with the content and stores them in the communication terminal. When the communication terminal uses the content, it calculates a usage determination reference time that indicates a time period during which the content can be used. Then the communication terminal compares the time indicated by the usage determination reference time with the time indicated by the time restriction information to determine whether the content can be used on the communication terminal.

As described, the present invention provides a method to restrict the usage of the content in a simple manner without being affected by the time kept by the clock of the mobile terminal or by the communication environment.

BRIEF DESCRIPTION OF THE DRAWINGS

FIG. 3 is a block diagram showing a data configuration in a hard disk of the content server.

FIG. 5 is a block diagram showing a data configuration in a non-volatile memory of the mobile telephone of the embodiment.

FIG. 11 is a diagram showing a relation between various time and time difference information according to the embodiment.

FIG. 12 is a diagram showing a data configuration in a non-volatile memory in the mobile telephone of the embodiment.

DETAILED DESCRIPTION OF THE INVENTION

Next, with reference to the drawings, embodiments of the present invention will be described.

1. Configuration 1.1. Configuration of the Communication System

Figure 1:
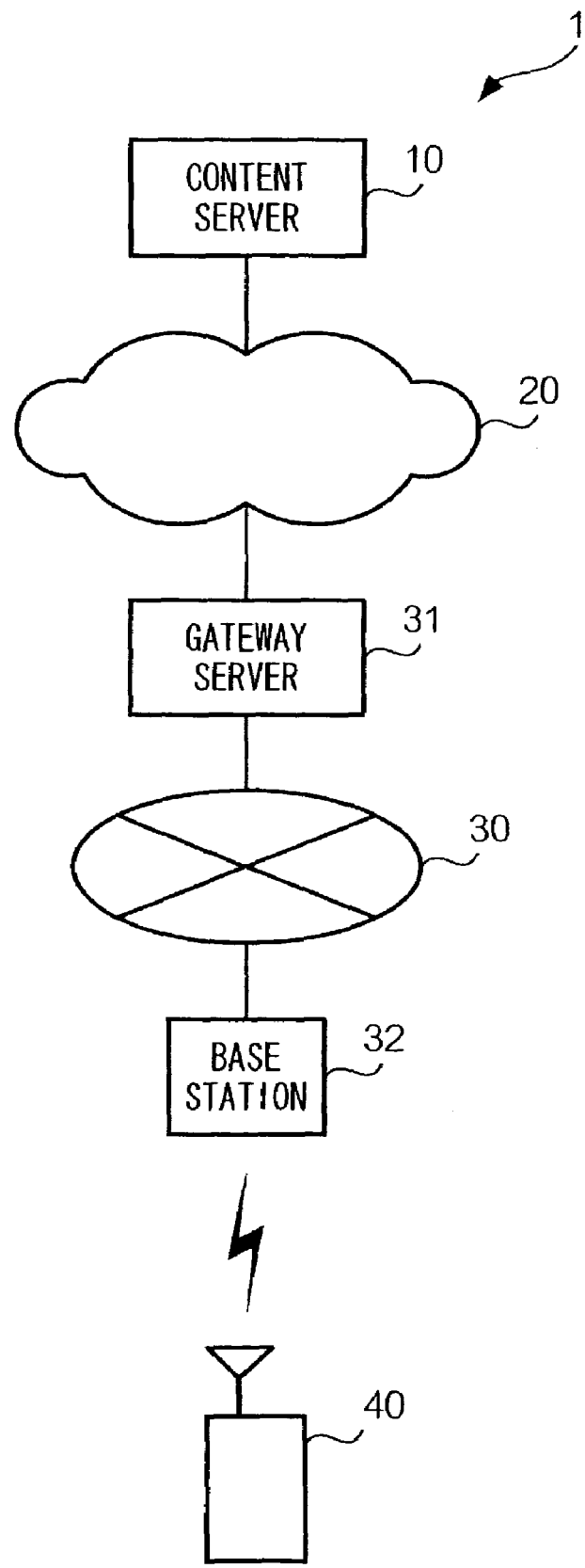
FIG. 1 is a block diagram showing a communication system of an embodiment of the present invention.

FIG. 1 is a block diagram showing a communication system 1 of an embodiment of the present invention. Communication system 1 comprises a content server 10, the Internet 20, a mobile packet communication network 30, and a mobile telephone 40. Note that in order not to make the figure too complicated, FIG. 1 shows only one unit of each of content server 10, mobile telephone 40, and base station 32. However, there are actually pluralities of them.

Content server 10 is a WWW (World Wide Web) server connected with the Internet 20, and can carry out a packet communication with mobile telephone 40 via the Internet 20 and mobile packet communication network 30. Content server 10 stores various contents such as image data or music data which are to be sent to mobile telephone 40.

Mobile packet communication network 30 is a communication network which provides a packet communication service to mobile telephone 40.

Gateway server 31 is situated between mobile packet communication network 30 and the Internet 20 and connects the both networks to each other. Gateway server 31 carries out protocol conversion between a communication protocol used in mobile packet communication network 30 and the Transmission Control Protocol/Internet Protocol (TCP/IP) or the Hyper Text Transfer Protocol (HTTP) used in the Internet 20. By this, gateway server 31 relays data between mobile packet communication network 30 and the Internet 20.

Within a communication service area of mobile packet communication network 30, many base stations 32 are installed, which carry out wireless communication with a mobile telephone 40 which is located in the radio cell of the base station 32.

Mobile telephone 40 is able to communicate with base station 32 and to receive a packet communication service or a telephone service. Mobile telephone 40 is able to conduct a packet communication with content server 10 and to download various content from content server 10.

1.2. Configuration of Content Server

Figure 2:
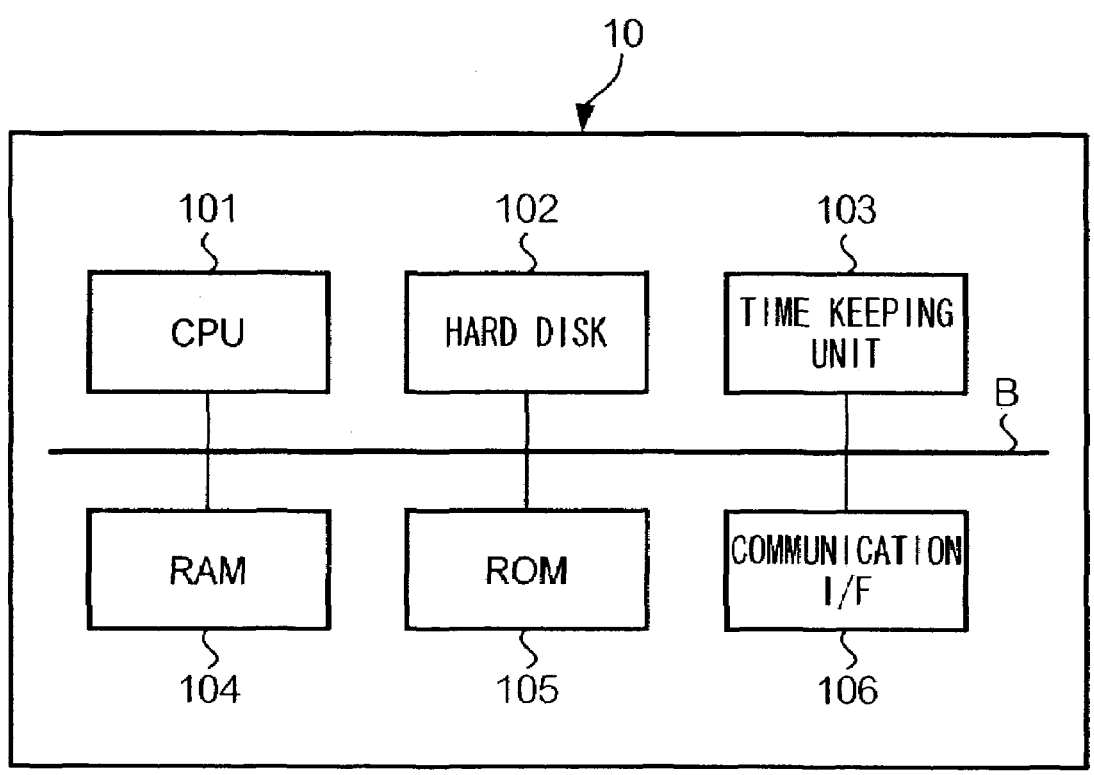
FIG. 2 is a block diagram showing a hardware configuration of a content server of the embodiment.

FIG. 2 is a block diagram showing a hardware configuration of a content server 10 shown in FIG. 1. As shown in the figure, content server 10 comprises a CPU 101, a hard disk 102, a time keeping unit 103, a RAM 104, a ROM 105, and a communication interface 106. These units are connected through a bus B.

Time keeping unit 103 comprises a oscillating circuit with a quartz resonator and a time counter which holds values indicating second, minute, hour, day, month, and year.

Time keeping unit 103 keeps time (hour, minute, and second) and date (year, month, and day) by, according to the oscillation of the oscillating circuit, incrementing each value of second, minute, hour, day, month, and year held in the time counter.

In the following description, in order to make the explanations short and simple, the term "time" is used to mean both time and date.

As shown in FIG. 3, provided in hard disk 102 are a content storing section 1021 and download user interface (U/I) file storing section 1022.

In content storing section 1021, various contents such as programs, image data, and music data are stored. Also content ID for each of them to identify them are stored. Further, information of data type indicating the attribute of the contents (as to whether it is music data, image data, or program) is also stored. Among the programs are application programs written in Java (trademark) program language.

In download U/I file storing section 1022, content IDs and Hypertext Markup Language (HTML) files for each of the content IDs are stored. These HTML files are text files containing description in HTML that makes up user interface for a user to input instruction to download content (hereinafter referred to as download instruction)

The THML file contains object element that specifies a content that is to be a download target. Data attribute in object element specifies Uniform Resource Locator (URL) of the content that is to be a download target.

In the HTML file with content ID "C0001", there is a param element. The value "period" of name attribute and the value of a value attribute for the name attribute in param element specify the time until when the content specified in object element can be used. This information on the time will be referred to as a time restriction information hereinafter. The value "period" of the name attribute in the param element indicates that the value of the value attribute for the name attribute specifies the time limit of the usage of the content. The value of the value attribute for the value "period" of the name attribute is a parameter for the value "period" of the name attribute and indicates the time limit of the usage of the content. In this explanation, the value of the value attribute is "2002/05/08/10/00", therefore, the user can use the content specified by content ID "C0001" on or before May 8, 2002, 10 o'clock morning.

In the HTML file with content ID "C0002", time restriction information is specified by the values "span" and "start"

of the name attribute and the value of the value attribute for the name attribute in param element. The value "span" of the name attribute in param element indicates that time limit of the usage of the content is specified in the value of the value attribute. The value of the value attribute for the value "span" of the name attribute is a parameter of the value "span" of the name attribute, and indicates the period during which the content can be used. The value "start" of the name attribute indicates that the value of the value attribute for the name attribute specifies the start point of the period during which the content can be used. The value of the value attribute for the value "start" of the name attribute is a parameter of the value "start" of the name attribute and indicates of the start point of the period during which the content can be used. In this explanation, the value of the value attribute for the value "span" of the name attribute is "30", and the value of the value attribute for the value "start" of the name attribute is "2002/12/24/00/00". Therefore, the user can use the content with content ID "C0002" thirty days from Dec. 24, 2002 00:00 am.

Note that in this embodiment, values of the name attribute of the param element are introduced by enhancing the conventional HTML, these are hereinafter referred to as "Enhanced HTML".

ROM 105 stores various programs executed by CPU 101. For example, ROM 105 stores an operating system, a program for sending content via the Internet 20. CPU 101 executes various programs in ROM 105 to control various units via bus B.

RAM 104 is used as a work area for CPU 101, so programs executed by CPU 101 or various data are stored temporarily.

Communication interface 106 controls communication processes between content server 10 and mobile telephone 40 established via the Internet 20 and mobile packet communication network 30.

1.3. Configuration of Mobile Telephone

Figure 4:
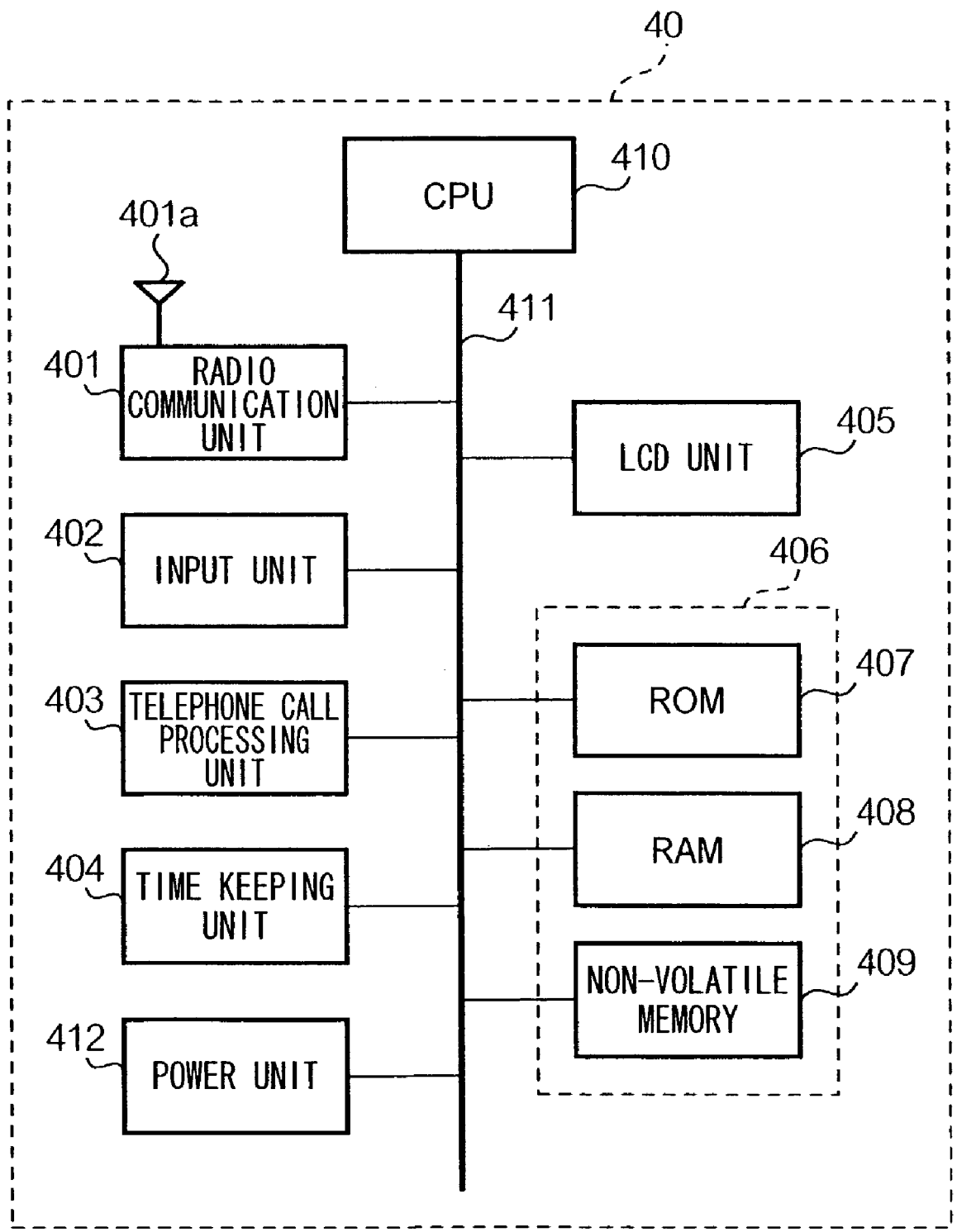
FIG. 4 is a block diagram showing a hardware configuration of the mobile telephone of the embodiment.

FIG. 4 is a block diagram showing a hardware configuration of the mobile telephone 40 shown in FIG. 1. Mobile telephone 40 in FIG. 1 comprises a radio communication unit 401, an input unit 402, a telephone call processing unit 403, a time keeping unit 404, an LCD unit 405, a storage unit 406, and a central processing unit (CPU) 410. These units are connected to each other via a bus 411.

CPU 410 executes various programs stored in storage 406 to control various units connected through bus 411.

Time keeping unit 404 comprises a oscillating circuit with a quartz resonator and a time counter which holds values indicating second, minute, hour, day, month, and year.

Time keeping unit 404 keeps time (hour, minute, and second) and date (year, month, and day) by, according to the oscillation of the oscillating circuit, incrementing each value of second, minute, hour, day, month, and year held in the time counter. Values according to the time counter are sent via bus 411 and displayed all the time on LCD unit 405.

The user is able to change the date and time kept by time keeping unit 404 by using input unit 402 in a certain manner.

Power unit 412 has a main power supply unit and an auxiliary power supply unit. The main power supply unit is a secondary battery such as a lithium ion battery, and supplies power for mobile telephone 40 to download content or to conduct telephone call. The auxiliary power supply unit is a secondary battery for backup, and supply power for keeping time in time keeping unit 404 and holding memory content in RAM 408 when the main power supply unit becomes discharged or it is replaced.

Radio communication unit 401 has an antenna 401a and controls communication with base station 32. Under control of CPU 410, radio communication unit 401, for example, modulates carrier signal to incorporate data concerning sending voice or packet communication to generate sending signal, and sends them via antenna 401a to base station 32. Radio communication unit 401 also receives radio signal from base station 32 via antenna 401a and obtains data concerning received voice or packet communication by demodulating the received signal.

Input unit 402 has keys for inputting numbers, characters, and operational instructions, and outputs to CPU 410 the signal according to the key operation. Telephone call processing unit 403 has for example microphone, speaker, and voice processing unit, and under control of CPU 410 processes telephone calling process including call connection and call disconnection.

Storage unit 406 has a Read Only Memory (ROM) 407, a Random Access Memory (RAM) 408, and a non-volatile memory 409 such as a Static-RAM (SRAM) or an Electrically Erasable Programmable-ROM (EEPROM). ROM 407 stores various programs that are executed by CPU 410. For example, ROM 407 stores an operating system, a web browser, software for building a JAVA runtime environment for mobile telephone 40.

The web browser is software for viewing web pages by interpreting HTML data to generate web pages, and displays them on LCD unit 405. The web browser in the present embodiment has a feature of interpreting the enhanced HTML written above in addition to the conventional functionality.

RAM 408 is used as a work area by CPU 410 and holds temporally programs and various data used by CPU 410.

Non-volatile memory 409 stores application programs for mobile telephone 40 and contents and various data downloaded from content server 10. Among application programs, there is a program that, based on time restriction information, determines whether the content is overdue, or calculates difference of the times between content server 10 and time keeping unit 404.

FIG. 5 is a diagram showing a data configuration of data in a non-volatile memory 409. Content downloaded from content server 10 is correlated with a content ID and stored in content storing section 1021. Also, a content ID is correlated with time difference information TS, time restriction information, and time reset flag and stored in download U/I file storing section 1022.

Time difference information TS is information indicating time difference between the time kept, when the mobile telephone 40 received the content, by time keeping unit 404 of mobile telephone 40 and sending time, the time when content server 10 sends the content, added to the content. Time difference information TS is used to calculate reference time for determining whether the content can be used. When time kept by time keeping unit 404 is changed, time difference information TS is updated by taking the change into consideration.

Time restriction information is information on the period of content usage, and is extracted from the HTML file for the web page for instructing download of the content.

Time reset flag is a flag to determine whether time kept by time keeping unit 404 is reset or not because of for example discharging of power unit 412. Time reset flag has a "0" value when resetting time has not been carried out, and becomes "1" for all the content ID when resetting time is carried out.

Further, described in a program in non-volatile memory 409 is a processing of the accuracy evaluation, which is performed by using the time reset flag, of difference indicated by time difference information TS; the accuracy of difference will be referred to as the accuracy of time difference information TS hereinafter. In this processing, the evaluation will be as follows; when the time reset flag has a value "0", the accuracy is high, and when the time reset flag has a value "1", the accuracy is low. Further, in this processing, in a case where the accuracy of time difference information TS stored in non-volatile memory 409 is low, even when an instruction to process of content with a usage period is given, processing the content will not be carried out.

This limitation is for promoting distribution of content with usage period. In general, content distributor who distributes content presumes that the content with usage period is used properly on the mobile telephone 40 when distributing the content. However, when time kept by time keeping unit 404 is reset, the accuracy of time difference information TS will become lower because the resetting does not update the content of time difference information TS. When content usage is restricted even by using time difference information TS with low accuracy, there will be a possibility of improper restriction of usage; hence the above presumption cannot be used. When the above presumption cannot be used, there will be smaller number of content distributor who distributes content with usage period. Therefore, in this embodiment, the accuracy of time difference information TS is evaluated and based on this evaluation content usage is restricted.

In non-volatile memory 409, time setting flag is stored. The time setting flag is a flag for determining whether time has been set by the user after the mobile telephone 40 is shipped from the factory. When shipping the mobile telephone 40, time setting flag has a value "0", and, when time is set, time setting flag is set with a value "1".

2. Operation

Next, the operation of the embodiment will be described.

2.1. Operation of Content Download Process

First, the user uses input unit 402 of the mobile telephone 40 to instruct the starting of a Web browser. Next, the user uses input unit 402 to input a URL to display a download page for a desired content (in this example, a content with content ID "C0001"). By this, a request message with the URL is sent to content server 10.

CPU 101 of content server 10 receives the request message, read out the HTML file for the content ID "C0001" specified by the URL in the request message, and sends back to the mobile telephone 40 a response message with the HTML file.

Figure 6:
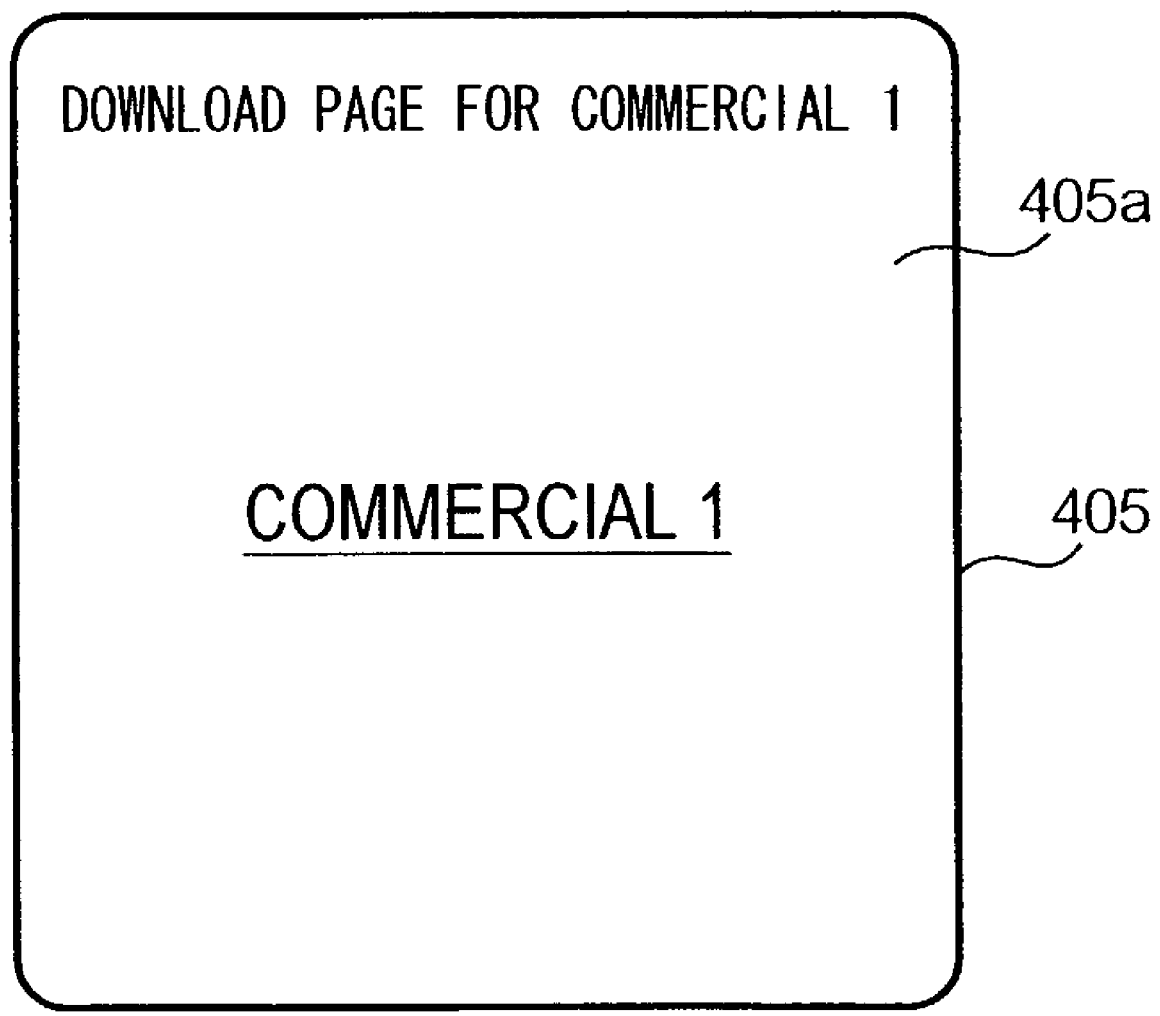
FIG. 6 is a diagram showing a screen image for a download page of the content of the embodiment.

The web browser in mobile telephone 40 interprets the HTML file in the response message, and displays a screen image 405a for the download page as shown in FIG. 6 on LCD unit 405 of mobile telephone 40.

Figure 7:
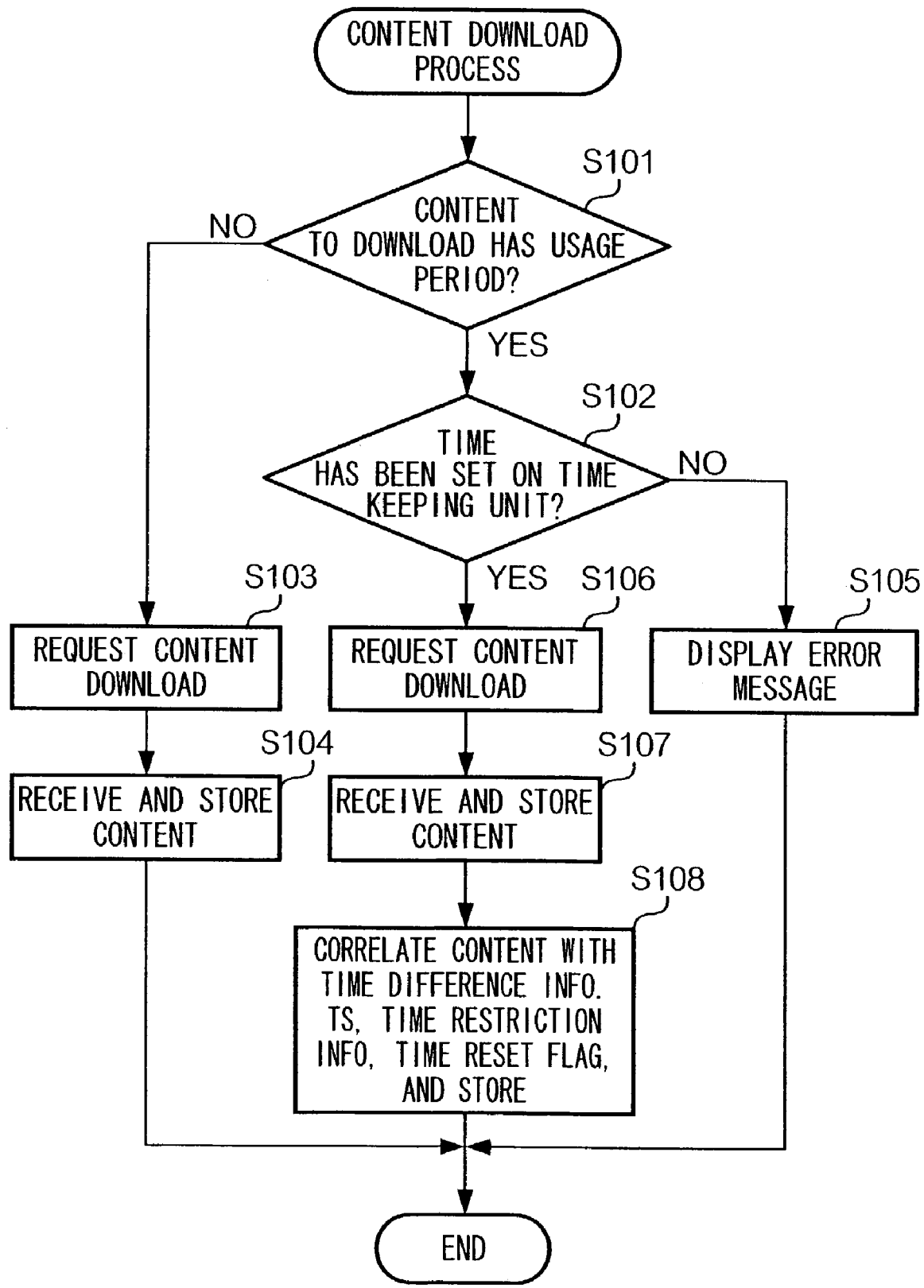
FIG. 7 is a flow chart showing a content download process from a content server by the mobile telephone of the embodiment.

When the user clicks on the text "commercial 1" on the screen image 405a of the download page, a content download process as shown in FIG. 7 is started.

First, CPU 410 of mobile telephone 40 determines whether the content to be downloaded has a usage period (step S101). In more detail, CPU 410 sees whether the HTML file sent from content server 10 has a keyword indicating the time restriction information such as the values "period", "span", or "start" for the name attribute in param element.

When it is determined that the content to be downloaded does not have a usage period because there is no keyword indicating time restriction information in the HTML file (step S101; NO), CPU 410 sends a request for downloading a content (hereinafter referred to as a download request) specified by content ID "C0001" in object element in the HTML file (step S103). The download request is relayed to content server 10 via mobile packet communication network 30 and the Internet 20.

Content server 10 reads out from content storing section 1021 the content with content ID "C0001" specified by URL in the download request, and sends it to mobile telephone 40.

CPU 410 of mobile telephone 40 receives the content sent from content server 10 and correlates it with content ID and stores it in non-volatile memory 409 (step S104).

On the other hand, in this explanation, as the value of the name attribute in the HTML file sent from content server 10 for the content ID "C0001" is "period", CPU 410 determines that the content to be downloaded has a usage period (step S101; YES). Further, CPU 410 sees the time setting flag in non-volatile memory 409 and determines whether time keeping unit 404 has been set before (step S102).

When it is determined that time has not been set before as the time setting flag has a value "0" (step S102; NO), CPU 410 cannot calculate time difference information TS because time is not set, and therefore CPU 410 displays on LCD unit 405 of mobile telephone 40 a message of for example "please set time for downloading this content" (step S105), and ends the processing.

In this explanation, as the time setting flag has a value "1", CPU 410 determines that time keeping unit 404 has been set before (step S102; YES), and sends a download request of content to content server 10 in the same way as step S107 (step S106).

CPU 101 of content server 10 reads out from content storing section 1021 of hard disk 102 a content with content ID "C0001" which is specified by the URL in the download request.

CPU 101 then reads out a current time (in this explanation, "2002/05/01 10:00:00" will be used). Then CPU 101 adds the current time (hereinafter referred to as sending time C0) of "2002/05/01 10:00:00" to the header of the content, and sends it to mobile telephone 40.

CPU 410 of mobile telephone 40 receives the content sent from content server 10, and correlates it to content ID "C0001", and stores it into non-volatile memory 409 (step S107).

CPU 410 of mobile telephone 40 then reads out from the header of the content the sending time C0 of "2002/05/01 10:00:00", and also reads out a time T0 that is held in the time counter of time keeping unit 404 at the point of receiving the content (in this explanation, this time is "2002/05/01 09:58:00").

Then, CPU 410 calculates time difference information TS that indicates the time difference between content server 10 and mobile telephone 40. In this explanation, this is two minutes as sending time C0 of "2002/05/01 10:00:00"—time T0 "2002/05/01 09:58:00" that is held in time keeping unit 404 at the point of receiving the content=two minutes.

As shown in FIG. 5, CPU 410 correlates calculated time difference information TS of "2 minutes" with content ID "C0001" and stores them into non-volatile memory 409. CPU 410 also correlates content ID "C0001" with time restriction information (such as the value "period" of the name attribute of param element and the value of the value attribute for the value "period") in the HTML file for displaying the screen image 405a for download page, and stores them (step S108).

In this explanation, the state of communication via the Internet 20 and mobile packet communication network 30 is satisfactory, therefore, there is almost no time difference between the timing of sending the content by content server 10 and the timing of receiving the content by mobile telephone 40. As a result, it is possible to correctly obtain, from time difference information TS, the time difference between the time keeping units 103 and 404 of content server 10 and mobile telephone 40 respectively 2.2. Time Change Process Next, described will be the process of recalculating time difference information TS in a case where the user changes time kept by time keeping unit 404 of mobile telephone 40.

When the user carries out a certain key operation on input unit 402 of mobile telephone 40 to instruct to start setting the time settings, CPU 410 reads out time held in the time counter of time keeping unit 404 and displays them on LCD unit 405. Next, the user overwrites new time T2 (in this case, 2002/05/07 10:00:00 is used) over the displayed time on LCD unit 405 and instructs to finish time setting. By this, CPU 410 stores the input time temporarily in RAM 408, and conducts time changing process shown in FIG. 8.

Note that while the user is conducting time changing operation, the time counter continues to increment the values for time held in the time counter of time keeping unit 404, and it is possible to cancel the time changing process until the user instructs to finish the time setting.

Figure 8:
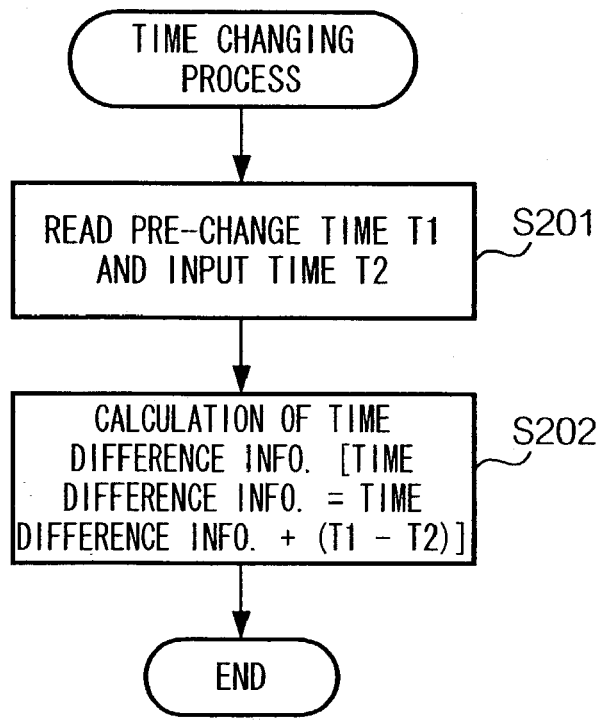
FIG. 8 is a flow chart showing a time changing process in the mobile telephone of the embodiment.

As shown in FIG. 8, CPU 410 reads out from the time counter of time keeping unit 404 a time T1 (in this explanation, 2002/05/08 12:00:00), and also reads out from RAM 408 a time T2 "2002/05/07 10:00:00" input by the user using input unit 402 (step S201).

Then CPU 410 reads out from non-volatile memory 409 time difference information TS of "2 minutes" for content ID "C0001". CPU 410 then adds to this time difference information TS "2 minutes" the difference between the time T1 and the time T2 (T1-T2) which is "one day and two hours". This results in the "one day two hours and two minutes". CPU 410 updates time difference information TS for content ID "C0001" with this result (step S202).

CPU 410 does the same to other time difference information TSs corresponding to all other content IDs by newly calculated values. CPU 410 then updates the time counter of time keeping unit 404 with the time T2 held temporarily in RAM 408.

2.3. Time Reset Flag Setting Process

Next, a process when the time kept in time keeping unit 404 of mobile telephone 40 is reset will be described.

Circumstances where time in time keeping unit 404 is reset can be when the backup battery is discharged and power is not supplied to time keeping unit 404, and thereby the content of the time counter of time keeping unit 404 disappears. When the time is reset, the value of the time counter of time keeping unit 404 become "00/00/00 00:00:00", and time keeping operation stops. This time reset flag setting process is periodically performed, for example once a second.

Figure 9:
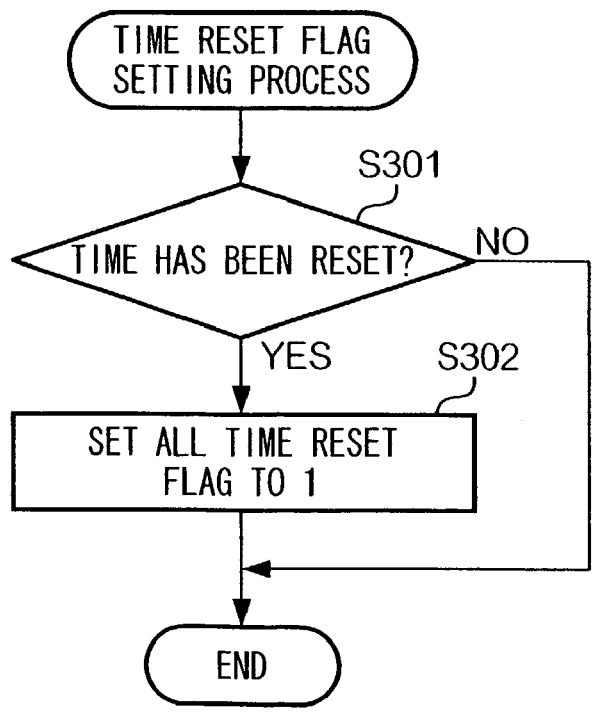
FIG. 9 is a flow chart showing a reset flag setting process in the mobile telephone of the embodiment.

FIG. 9 is a flow chart showing a time reset flag setting process.

As shown in this figure, CPU 410 determines whether time kept by time keeping unit 404 has been reset or not (step S301). To illustrate, CPU 410 sees whether the value of the time counter of time keeping unit 404 is "00/00/00 00:00:00" or not.

When CPU 410 determines the time have not been reset (step S301; NO), CPU 410 stops the process.

On the other hand, when the value of the time counter of time keeping unit 404 is "00/00/00 00:00:00", and CPU 410 determines the time has been reset (step S301; YES), CPU 410 changes (step S302) the values of all the time reset flags stored in non-volatile memory 409 with relation to content IDs into the values "1" which indicates that time has been reset. Then CPU 410 stops the process.

2.4. Process of Content Processing

Next, the process of content processing in mobile telephone 40 will be described.

Figure 10:
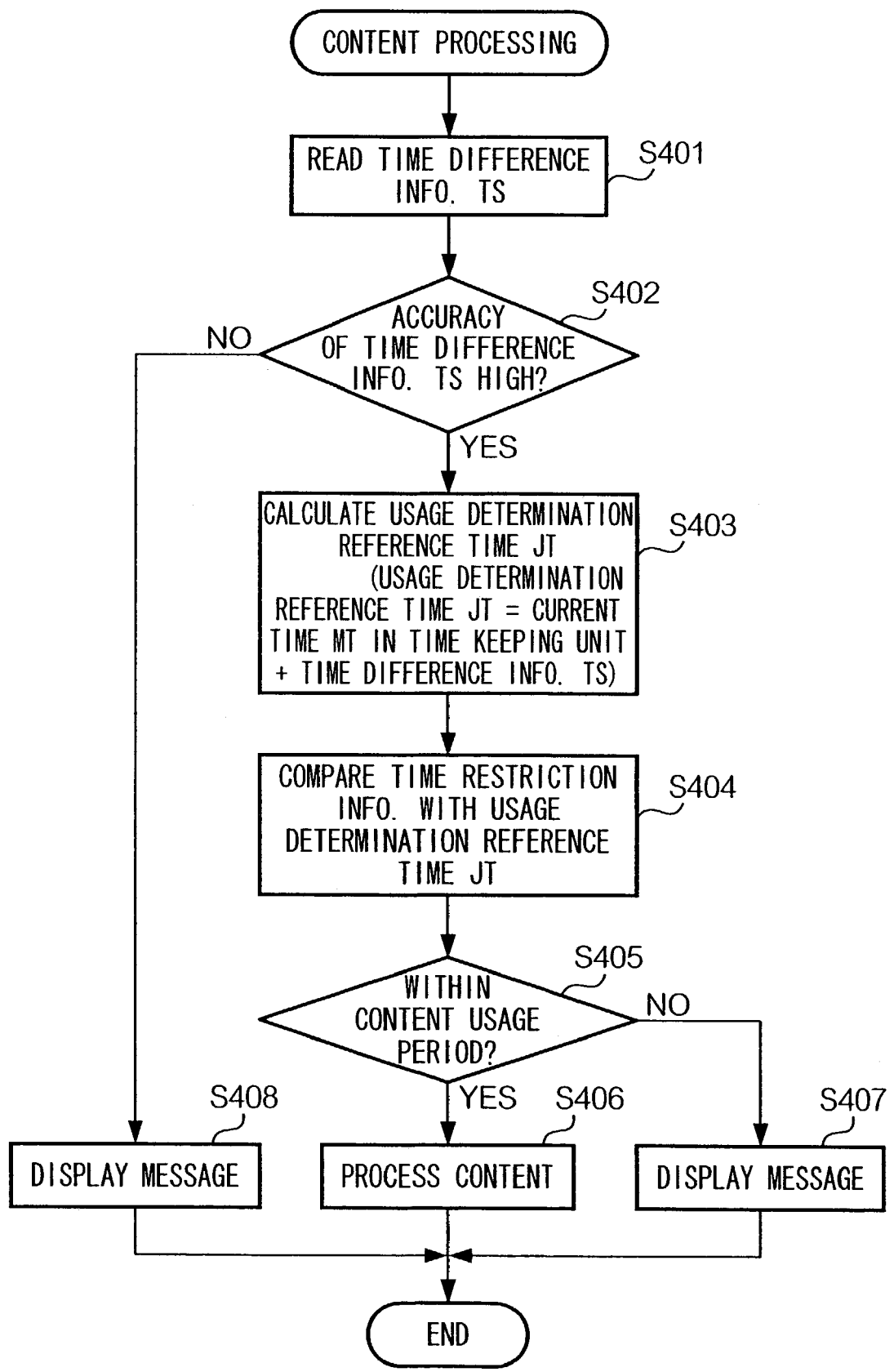
FIG. 10 is a flow chart showing a process when an instruction to process a content is made by the mobile telephone of the embodiment.

First, the user uses keys of input unit 402 of mobile telephone 40 to instruct to process the desired content (in this explanation, the content with content ID "C0001"). By this instruction, CPU 410 starts the process of content processing shown in FIG. 10.

CPU 410 reads out from non-volatile memory 409 time difference information TS "one day two hours and two minutes" which is correlated with content ID "C0001" (step S401).

CPU 410 then evaluates if the accuracy of the read-out time difference information TS is high or low (step S402).

To illustrate, CPU 410 sees the time reset flag held in non-volatile memory 409. When the value of the time reset flag is "1" which indicates that the time has been reset, CPU 410 judges the accuracy of time difference information TS is low. When the value of the time reset flag is "0" which indicates that the time has not been reset, CPU 410 judges the accuracy of time difference information TS is high.

The reason for the above are as follows. When the time kept by time keeping unit 404 is reset because for example the backup battery in power unit 412 is discharged, time kept by time keeping unit 404 is changed (reset) without conducting the above "2.2 time change process", and time keeping operation is stopped as the power is not supplied to time keeping unit 404, hence the accuracy of time difference information TS becomes low.

As described above, when the accuracy of the read-out time difference information TS is judged to be low (step S402; NO), a usage determination reference time JT (later described) is not correctly calculated. Therefore, CPU 410 displays on LCD unit 405 a message for example "this content cannot be processed" (step S408), and stops the process.

On the other hand, in this case, the value of the reset flag for content ID "C0001" is "0". Namely, the accuracy of the read-out time difference information TS is judged to be high (step S402; YES). Therefore, CPU 410 adds to the current time MT (2002/05/07 12:00:00 is used here) kept by time keeping unit 404 the time difference information TS "one day two hours and two minutes". By this, CPU 410 calculates the usage determination reference time JT (in this case 2002/05/08 14:02:00) (step S403).

Usage determination reference time JT is a time which is obtained by calculating time correctly from sending time C0 without being affected by above 2.2. time change process.

Then CPU 410 reads out "2002/05/08/10/00", a time limit to use the content, from the time restriction information which is correlated with content ID "C0001" and stored in non-volatile memory 409, and changes it into a second format, that is "2002/05/08 10:00:00". Then CPU 410 compares this time limit "2002/05/08 10:00:00" with usage determination reference time JT "2002/05/08 14:02:00" (step S404).

In this case, usage determination reference time JT "2002/05/08 14:02:00" is outside of the time limit "2002/05/08 10:00:00" (step S405; NO), therefore CPU 410 displays on LCD unit 405 a message for example "usage period expired" (step S407), and stops the process of content processing.

On the other hand, when, when usage determination reference time JT is within the time limit (step S405; YES), CPU 410 processes the specified content (step S406).

As described, even when the current time MT "2002/05/07 12:00:00" kept by time keeping unit 404 is within the time limit "2002/05/08 10:00:00", as the judgement whether it is possible to process the content is made based on the comparison between calculated usage determination reference time JT "2002/05/08 14:02:00" and the time limit "2002/05/08 10:00:00", it is possible to restrict the process of the content without being affected by the current time MT kept by time keeping unit 404.

FIG. 11 is a table showing a relation of above described processes as between various time and time difference information TS.

As shown in FIG. 11, a time period from the point of downloading the content to the point of instructing to process the content is "T3−T0". If during this period content server 10 keeps time correctly, the time on content server 10 when making the instruction to process the content is the current time CT=C0+T3−T0.

Also, the time difference information TS when making instruction to process the content will be TS=(C0−T0)+(T1−T2). Further, the current time MT of time keeping unit 404 will be MT=T3+(T2−T1). From these, usage determination reference time JT will be JT=MT+TS={T3+(T2−T1)}+{(C0−T0)+(T1−T2)}=C0+T3−T0. This matches the current time CT of content server 10.

As described, comparison between usage determination reference time JT and time restriction information enables the restriction of content usage in a way as desired at the point of sending the content from content server 10.

Also, when it is unlikely to be able to restrict the content usage in a way as desired at the point of sending the content, it is possible to reject the download or processing of content. This is for example when time is not set in time keeping unit 404, and when the accuracy of time difference information TS stored in non-volatile memory 409 is judged to be low.

As described, according to the present embodiment, based on usage determination reference time JT, and without being affected by the time kept by time keeping unit 404 of the mobile terminal 40 or by the communication environment, it is possible to determine whether it is possible to process the downloaded content from content server 10 onto mobile telephone 40.

3. Modifications

As described, the embodiments of the present invention have been described. However, the foregoing descriptions of specific embodiments of the present invention have been presented for purposes of illustration and can be modified without departing from the sprit of the present invention. Some of the modifications will be described below.

3.1 Modification 1

In the above embodiment, content is not be processed after the time limit indicated by time restriction information. However, it is possible to unable the content to be processed until a certain time limit.

For example, it is possible to distribute beforehand from content server 10 to a plurality of mobile telephone music which should not be played until a certain time. By this, it is possible to prevent content server 10 from being loaded with download requests from mobile telephone 40 when a certain time has passed.

Also, it is possible to add two more information of "start time" and "end time" to time restriction information, and to enable to control the content processing.

For example, when the content is program for displaying a ticket pre-order page and sending the pre-order data, it is possible to restrict the content processing on mobile telephone 40 before "start time" and after "end time". By this, ticket pre-sale with pre-order time period becomes possible.

Further, by adding "start time" and "period from the start time" into time restriction information, it is possible to enable to control the content processing.

For example, when this is applied to the above ticket ordering, content processing is prohibited before "start time", and after "period from the start time".

3.2 Modification 2

In the above embodiment, as shown in FIG. 5, a list showing relations between content ID, time difference information TS, and time restriction information is stored in non-volatile memory 409. However, this is just showing an idea of storing content, time difference information TS, and time restriction information with relationship. For example, it is possible to correlate content itself with time difference information TS and time restriction information and to store them in non-volatile memory 409.

3.3 Modification 3

In the above embodiment, as shown in FIG. 5, time difference information is stored for each content. However, it is possible to store time difference information TS for each content server 10 by correlating content with content server 10.

As a method to correlate content with content server 10, it is preferable to use IP "Internet Protocol" addresses of content server 10 as shown in FIG. 12. This address is added to the header of the content when sending the content from content server 10 to mobile telephone 40.

Figure 13:
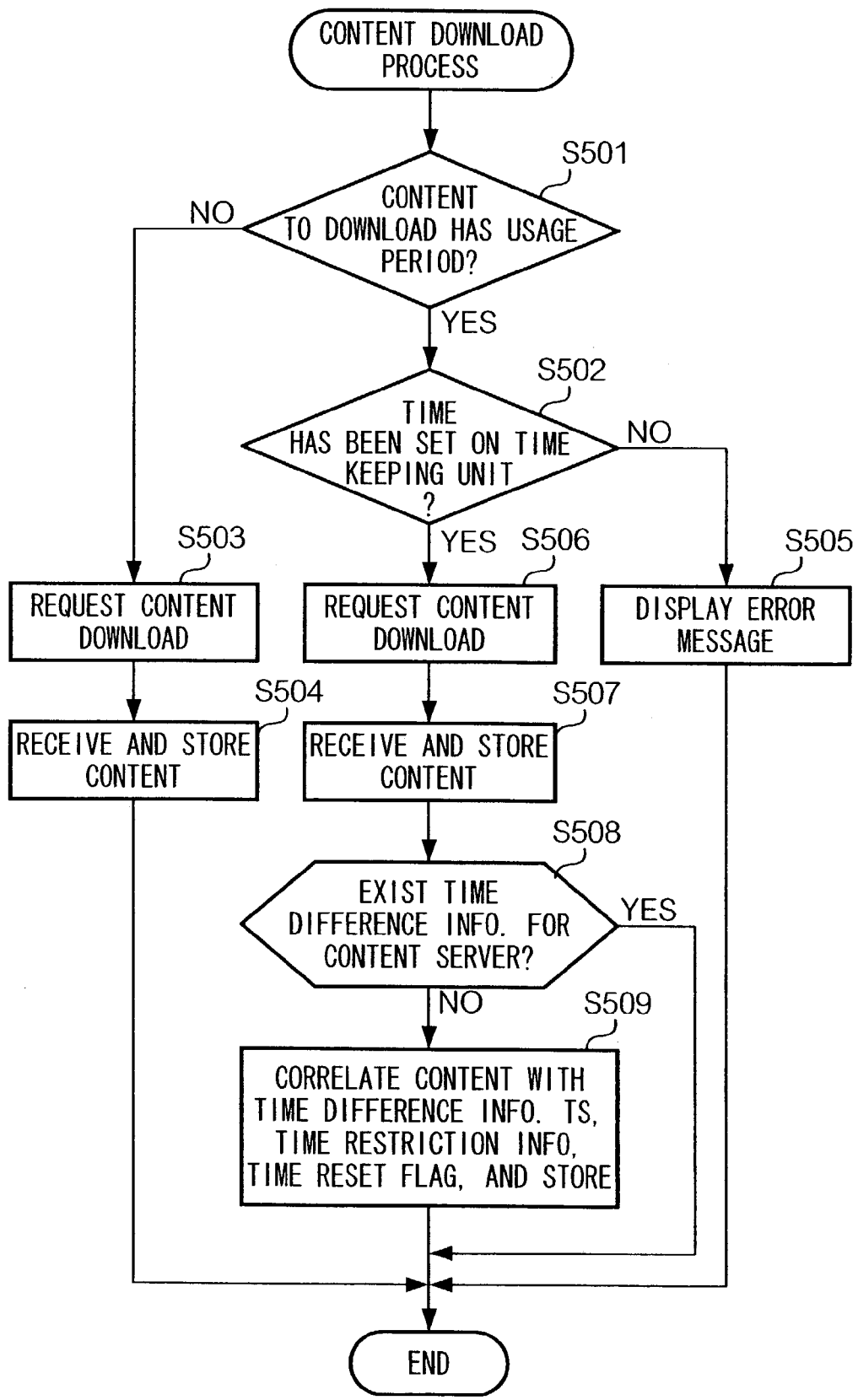
FIG. 13 is a flow chart showing a content download process from a content server by the mobile telephone of the embodiment.

With reference to FIG. 13, operation of content download process in this modification will be described.

Steps S501 to S507 are the same as steps S101 to S107 shown in FIG. 7.

In step S508, CPU 410 of mobile telephone 40 reads the address written in the header of the content (in this case, "225.11.22.33"). Then CPU 410 sees whether there is time difference information TS for this address "225.11.22.33" in non-volatile memory 409.

When there is time difference information TS for this address "225.11.22.33" in non-volatile memory 409 (step S508; YES), CPU 410 stops the process.

When there is no time difference information TS for this address "225.11.22.33" in non-volatile memory 409 (step S508; NO), CPU 410 reads a content server's sending time C0 "2002/05/01 10:00:00" which is written in the header of the content, and time restriction information in the HTML file for the screen image 405a for the download page.

Then CPU 410 correlates content ID with time restriction information, time reset flag "0", and an address "225.11.22.33", and stores them in non-volatile memory 409.

Further, CPU 410 reads out the time (in this explanation, "2002/05/01 09:58:00") which is held at the time of receiving the content in the time counter of time keeping unit 404. Then CPU 410 calculates time difference information TS (namely, content server's sending time C0 "2002/05/01 10:00:00"—time T0 "2002/05/01 09:58:00" kept by time keeping unit at the point of receiving the content; resulting in two minutes) which indicates a time difference between content server 10 and mobile telephone 40. CPU 410 then correlates time difference information of two minutes with the address "225.11.22.33", and stores them in non-volatile memory 409 (step S509).

In the above embodiment, in the time changing process, CPU 410 adds to time difference information TS which is stored in non-volatile memory 409 time difference between before and behind the change. In this modification, time difference between before and behind the change is added to time difference information TS stored for each of the address of content server 10.

In the process of the content processing, in the above embodiment, CPU 410 calculates usage determination reference time JT by using time difference information TS which is correlated with content ID which is instructed to be processed. However, in this modification, usage determination reference time JT is calculated by using time difference information TS which is correlated with content ID (in more detail, an address is obtained from a content ID, then time difference information is obtained from the address.).

Other operations are the same as the above embodiment, therefore, same explanation will not be given As described, by storing time difference information TS for each content server 10, it becomes possible to reduce the amount of data compared to storing time difference information TS for each content.

However, in this modification, when maintenance personnel of content server 10 makes a mistake when setting time of content server 10, time keeping unit 103 keeps a wrong time from this mistake. When mobile telephone 40 downloads from this content server 10 several contents over the period of mistake, following drawbacks will occur.

Namely, when calculating usage determination reference time JT for the content downloaded after the mistake, time difference information TS calculated with respect to the content which is downloaded before the mistake is used; hence usage determination reference time JT will becomes inaccurate. Therefore, when the accuracy of the time of content server 10 is high, this modification should be used.

3.4 Modification 4

In the above embodiment, when content server 10 sends content, content server 10 adds to the content time data kept by time keeping unit 103 as a sending time C0. However, gateway server 31 may add time data.

However, in this case, when the time kept by time keeping unit 103 of content server 10 is different from the time kept by the time keeping unit of gateway server 31, sending time C0 cannot be regarded as the time of sending content by content server 10. Therefore, the time kept by the time keeping unit of gateway server 31 and time keeping unit 103 of content server 10 have to be synchronized.

In this case, the method of sending content is as follows. When content server 10 sends content to mobile telephone 40 via gateway server 31, CPU 101 of content server 10 adds request data for addition of time information to the content, and sends it. CPU of gateway server 31 adds to the content the time kept by its time keeping unit, and sends it to mobile telephone 40.

By this, the time added by gateway server 31 to the content can be regarded as the time when content server 10 sends the content.

3.5 Modification 5

In 2.1. operation of content download process of the above embodiment, when it is judged that time has not been set before on time keeping unit 404, CPU 410 displays a message on LCD unit 405 of mobile telephone 40 and ends the process. However, other operation may be used. For example, it is possible to display a message and the time setting screen image on LCD unit 405 to promote the user to set time.

Also, in 2.4. process of content processing, when displaying on LCD unit 405 a message telling that the content cannot be processed, it is possible to display another message in addition of this message promoting the user to delete the content or not. Further, another modification to the above embodiment is possible. That is, even when it is possible to process the content, displaying the usage time limit of the content before processing the content may be carried out.

3.6 Modification 6

In the above embodiment, when the backup battery is discharged, power is not supplied to time keeping unit 404, and therefore the content of the time counter of time keeping unit 404 is cleared, the time of time keeping unit 404 is reset. However, this is not only the case when the time is reset. For example, the user may instruct to reset the time by using input unit 402 of mobile telephone 40. Also, when mobile telephone 40 receives a hard impact or experiences sudden temperature change and therefore malfunction occurs, the content in the time counter of time keeping unit 404 may be cleared.

3.7 Modification 7

In the above embodiment, when the time kept by time keeping unit 404 has been reset before, the accuracy of time difference information TS is judged to be low. However, this is only one case. For example, CPU 410 may judge the accuracy of time difference information TS to be low when following conditions are satisfied.

(a) the value of year part in TS is over 3000.
(b) the value of month part in TS is over 12.
(c) the value of day part in TS is over 366.
(d) the value of time part in TS is outside from "00:00:00" to "23:59:59".

3.8 Modification 8

In the above embodiment, when the time kept by time keeping unit 404 of mobile telephone 40 has not been set before, downloading the content is not carried out. Also, when the accuracy of time difference information TS is judged to be low, the processing the content is not carried out. However, these are not the only embodiments. Even when the time kept by time keeping unit 404 of mobile telephone 40 has not been set before, downloading the content may be carried out. Also, even when the accuracy of time difference information TS is judged to be low, the processing the content may be carried out.

For this modification, there is no need to provide the time reset flag or the time setting flag in non-volatile memory 409 of mobile telephone 40. The process of this modification will be given here in contrast with the above embodiment.

Operation of content download process: same as 2.1., but without steps S101 to S105.

Time change process: same as 2.2.

Process of content processing: same as 2.4., but without steps S402 and S408.

Note that in this modification, time reset flag setting process as described in 2.3. is not carried out.

3.9 Modification 9

In the above embodiment, there was no time difference between content server 10 and mobile telephone 40 due to their location (i.e. due to their longitude). However, the present invention can be used even when there is time difference between content server 10 and mobile telephone 40 due to their location. This can be achieved by changing the time restriction information in HTML file for download page into Greenwich Mean Time (GMT) format, and changing the sending time information in the header which is added when sending the content into GMT format, and also by calculating time in GMT format in mobile telephone 40 (or calculating time after changing time in GMT format into local time format).

3.10 Modification 10

In the above embodiment, content server 10 obtains the current time from time keeping unit 103 in content server 10. However, other method can be used. For example, content server 10 can obtain the current time from a time server on a network by using a Simple Network Time Protocol (SNTP).

3.11 Modification 11

In the above embodiment, the HTML file for displaying a screen image 405a for download page contains a time restriction information. And by sending this HTML file from content server 10 to mobile telephone 40, mobile telephone 40 obtains the time restriction information. However, other method can be used. For example, content server 10 can add to the header of the content a time restriction information when content server 10 sends the content to mobile telephone 40.

3.12 Modification 12

The present invention can be applied not only to mobile telephone 40 but also other communication terminal. Further, the present invention can be applied to various electrical appliances with communication function such as Personal Handyphone System (PHS) terminal, a Personal Digital Assistant (PDA), a car navigation system, and a personal computer.

What is claimed is:

1. A communication terminal comprising:
a time keeping unit operable to keep time;
a storage unit;
a processor operable to receive from a server a content, together with sending time information indicative of a time when the content was sent by the server, and time restriction information indicative of a time when the content can be used, the processor further operable to correlate and store the content, the sending time information, and the time restriction information in the storage unit;
a time difference information calculation unit executable with the processor when the content is received, to calculate time difference information,
the time difference information indicative of a time difference between the stored sending time information and a time of receipt of the content, the time of receipt of the content suppliable by the time keeping unit,
the time difference information calculation unit further operable to store the time difference information in the storage unit in association with the content;
a reference time calculating unit executable with the processor when the content is executed to calculate a usage determination reference time by adjustment of a time, indicated by the time keeping unit when the content is executed, by the time difference indicated by the time difference information; and
a content usage determination unit executable with the processor to compare the usage determination reference time with a time indicated by the time restriction information, to determine whether the content can be further executed.

2. A communication terminal according to claim 1, wherein:
the processor is further operable to receive an identification of the server and store the identification in association with the content; and
wherein the reference time calculating unit is further executable to read the identification of the server stored in the storage unit in association with the content, and add the time difference indicated by the time difference information stored in the storage unit in association with the identification of the server, to a time indicated by the time keeping unit at a time of execution of the content, in order to calculate the usage determination reference time.

3. A communication terminal of claim 1, further comprising,
a time difference information recalculation unit executable by the processor, when a time kept by the time keeping unit is changed after receipt of the content, to add to the time difference information a time difference between the times before and after the time change.

4. A communication terminal of claim 1,
wherein the time restriction information is information indicative of an expiration point, until which the content can be executed; and
wherein the content usage determination unit is executable to determine that the content can be used only when the usage determination reference time is prior to the expiration point indicated by the time restriction information.

5. A communication terminal of claim 1,
wherein the time restriction information is information indicative of a start point in time from which the content can be used; and
wherein the content usage determination unit is executable to determine that the content can be used when the usage determination reference time is subsequent to the start point in time indicated by the time restriction information.

6. A communication terminal of claim 1,
wherein the time restriction information comprises a plurality of information indicating time that includes a first information that is a first time indicative of a start point in time from which the content can be used, and a second information that is a second time indicative of an end point in time until which the content can be used; and
wherein the content usage determination unit is executable to determine that the content can be used when the usage determination reference time is subsequent to the first time and prior to the second time.

7. A communication terminal of claim 1, further comprising:
a time reset judgment unit executable by the processor to judge whether a time kept by the time keeping unit has been previously reset;
wherein the content usage determination unit is executable to determine that the content cannot be used on the communication terminal when the time reset judgment unit is operable to judge that the time has been previously reset.

8. A communication terminal of claim 1, further comprising:

a time reset judgment unit executable by the processor to judge whether the time kept by the time keeping unit has been previously reset;

an evaluation unit executable by the processor to evaluate an accuracy of the time difference, indicated by the time difference information stored in the storage unit in relation with the content, on the basis of a judgment of the time reset judgment unit;

wherein the content usage determination unit is executable to determine that the content cannot be used when the evaluation unit evaluates the accuracy to be below a determined threshold.

9. A communication terminal of claim 1, further comprising:

a time setting unit executable with the processor to set a time of the time keeping unit;

a content receive permit unit executable with the processor to permit download of the content from the server when a time has been set by the time setting unit; and a content receive prohibit unit executable with the processor to prohibit download of the content when a time has not been set by the time setting unit.

10. A communication terminal configured to execute instructions comprising:

a memory;

instructions stored in the memory that are executable to receive and store:

content downloadable from a server, a sent time value indicative of a clock time that the content was sent from the server, and a time restriction indicative of a determined time period that the content is enabled to be processed with the communication terminal;

instructions stored in the memory that are executable when the content is received to calculate a time difference value between the sent time and a first kept time value, the first kept time value is a clock time incrementally generated with the communication terminal to be indicative of a time of day and a calendar date of when the content was received;

instructions stored in the memory to store the time difference value in association with the content;

instructions stored in the memory that are executable, in response to initiation with the communication terminal of usage of the stored content, to adjust a second kept time value by the time difference value, the second kept time value is another clock time incrementally generated with the communication terminal later in time and different than the first kept time value; and instructions stored in the memory that are executable to determine if the adjusted second kept time value falls within the time restriction.

11. The communication terminal of claim 10, wherein the second kept time value is incrementally generated at about the time of initiation with the communication terminal of usage of the stored content.

12. The communication terminal of claim 10, further comprising instructions stored in the memory that are executable to process the content if the adjusted second kept time value falls within the time restriction, and instructions stored in the memory that are executable to generate a message indicative of expiration of a usage period if the adjusted second kept time value falls outside of the time restriction.

13. The communication terminal of claim 10, further comprising instructions stored in the memory that are executable to update the time difference value when the clock time is changed via a user input included on the communication terminal.

14. The communication terminal of claim 13, wherein the instructions stored in the memory that are executable to update the time difference value when the clock time is changed comprises instructions stored in the memory to subtract the sent time value from the first kept time value, and add the difference in the clock time before the change and the clock time after the change.

15. The communication terminal of claim 10, further comprising instructions stored in the memory that are executable to determine if the clock time has been reset to zero, and instructions stored in the memory that are executable to disable usage of the stored content when the clock time has been reset.

16. The communication terminal of claim 10, further comprising instructions stored in the memory that are executable to deny receipt of the content when the first kept time value has not been initially set.

17. The communication terminal of claim 10, further comprising instructions stored in the memory that are executable to determine an accuracy of the time difference value, and instructions stored in the memory to disable usage of the stored content when the accuracy of the time difference value is at or below a predetermined level of accuracy.

18. The communication terminal of claim 17, wherein the instructions stored in the memory that are executable to determine an accuracy of the time difference value, comprises instructions stored in the memory to identify when the clock time has been reset.

19. The communication terminal of claim 17, wherein the instructions stored in the memory that are executable to determine an accuracy of the time difference value, comprises instructions stored in the memory to identify when the clock time is outside of a predetermined limit.

20. A method of restricting processing of content with a communication terminal, the method comprising:

with a communication terminal incrementally generating a plurality of kept time values that are each a clock time incrementally indicative of a time of day and a calendar date;

receiving, with the communication terminal from a server, content downloadable from the server, a sent time value indicative of a clock time that the content was sent from the server, and a time restriction indicative of a determined time period when the content is enabled to be executed with the communication terminal;

the communication terminal calculating, when the content is received, a time difference between the sent time value and a first kept time value generated at about the time the content was received;

the communication terminal storing the content, the sent time value, the time restriction, and the time difference in association with a content identifier of the content;

in response to initiation of execution of the content, adjusting a second kept time value by the time difference, wherein the second kept time value was generated about coincident with the initiation of execution;

enabling execution of the content when the adjusted second kept time value is within the time restriction; and generating a denial message when the adjusted second kept time value is outside the time restriction.

21. The method of claim 20, wherein the step of receiving further comprises determining an accuracy of the time difference, and restricting usage of the content when the accuracy of the time difference is below a predetermined level.

22. The method of claim 20, wherein the step of enabling processing further comprises determining if one of the kept time values has been reset to zero, and disabling usage of the content when one or more of the kept time values have been reset.

23. The method of claim 20, further comprising updating the time difference in response to a change in one of the kept time values via an input unit included on the communication terminal.

24. The method of claim 23, wherein updating the time difference in response to a change in one of the kept time values comprises subtracting the first kept time value from the sent time, and adding a time difference representative of a difference in time before and after the change in the one of the kept time values.

25. A communication terminal comprising:

a processor; and a clock in communication with the processor, the clock operable to incrementally generate a plurality of clock times indicative of a time of day and a calendar date;

wherein the processor is configured to receive transmitted content, a content transmission time indicative of a time of day and a calendar date when the content is transmitted, and predetermined content usage time limit information;

the processor further configured, when the transmitted content is received, to determine a time difference value between the content transmission time, and a clock time at about a point in time when the content is received; and a memory in communication with the processor, the processor further configured to store the content in association with the predetermined content usage time, and the time difference value in the memory;

in response to receipt of a command to execute the transmitted content, the processor is operable to change a clock time generated at about a point in time when the command was received to include the time difference, the processor further operable to enable execution of the transmitted content only when the changed clock time is within the predetermined content usage time limit information.

26. The communication terminal of claim 25, further comprising an input unit coupled with the processor and configured to receive a user input, wherein the processor is further configured, in response to receipt of a user input to change the clock via the input unit, to calculate a difference in time between a current clock time and a clock time input by a user, and to add the difference in time to the time difference value.

* * * * *